(12) United States Patent
Kim (10) Patent No.: US 10,174,135 B2
(45) Date of Patent: Jan. 8, 2019

(54) LOW VISCOSITY, WATER-BORNE, ACRYLIC MODIFIED ALKYD DISPERSION AND METHOD OF PRODUCTION THEREOF

(71) Applicant: Arkema Inc., King of Prussia, PA (US)

(72) Inventor: Kyu-Jun Kim, Cary, NC (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 15/039,044

(22) PCT Filed: Nov. 24, 2014

(86) PCT No.: PCT/US2014/067023
§ 371 (c)(1),
(2) Date: May 25, 2016

(87) PCT Pub. No.: WO2015/077677
PCT Pub. Date: May 28, 2015

(65) Prior Publication Data
US 2017/0174797 A1   Jun. 22, 2017

Related U.S. Application Data

(60) Provisional application No. 61/908,296, filed on Nov. 25, 2013.

(51) Int. Cl.
*C08F 8/30* (2006.01)
*C09D 151/08* (2006.01)
(Continued)

(52) U.S. Cl.
CPC .............. *C08F 8/30* (2013.01); *C08F 8/00* (2013.01); *C08G 18/0823* (2013.01); *C08G 18/36* (2013.01); *C08G 18/4288* (2013.01);

*C08G 18/758* (2013.01); *C09D 11/105* (2013.01); *C09D 151/08* (2013.01);
(Continued)

(58) Field of Classification Search
CPC ............................... C08F 8/30; C09D 151/08
See application file for complete search history.

(56) References Cited

U.S. PATENT DOCUMENTS 3,639,315 A   2/1972  Rodriguez
4,147,674 A   4/1979  Vasta
(Continued)

FOREIGN PATENT DOCUMENTS

CN   102108246 A   6/2011
EP   2 444 436 A1   4/2012
(Continued)

*Primary Examiner* — Robert D. Harlan
(74) *Attorney, Agent, or Firm* — Lynn B. Morreale (57) ABSTRACT

A water-borne, urethane and acrylic modified alkyd dispersion, wherein the dispersion is substantially surfactant free and has less than 1 weight % volatile organic compounds (VOCs) is described. Additionally, a method for preparing a water-borne, substantially surfactant free, urethane and acrylic modified alkyd dispersion, with less than 1 weight % VOC, is described. In the method, an acrylic modified alkyd polymer is reacted with a basic compound in water to form an acrylic modified alkyd dispersion having a first viscosity and then a hydrophobic seed is added thereto to form a urethane and acrylic modified alkyd dispersion having a second viscosity, which is substantially less than the first viscosity.

10 Claims, 4 Drawing Sheets

(51) Int. Cl.
   *C08G 18/75*   (2006.01)
   *C08F 8/00*    (2006.01)
   *C08G 18/08*   (2006.01)
   *C09D 175/06*  (2006.01)
   *C08G 18/36*   (2006.01)
   *C08G 18/42*   (2006.01)
   *C09D 11/105*  (2014.01)

(52) U.S. Cl.
   CPC ....... *C09D 175/06* (2013.01); *C08G 2150/90* (2013.01); *C08G 2170/80* (2013.01)

(56) References Cited

U.S. PATENT DOCUMENTS

| | | | |
|---|---|---|---|
| 4,250,282 A | 2/1981 | Dorries et al. | |
| 6,166,150 A | 12/2000 | Wilke et al. | |
| 2008/0319141 A1 | 12/2008 | Reidlinger et al. | |
| 2011/0217478 A1* | 9/2011 | De Waele | C09D 11/101 427/500 |
| 2012/0121903 A1* | 5/2012 | Betremieux | C08F 2/24 428/375 |

FOREIGN PATENT DOCUMENTS

| | | | |
|---|---|---|---|
| EP | 2 481 763 A1 | 8/2012 | |
| WO | WO 2004/060949 A1 | 7/2004 | |
| WO | WO 2008/086977 A1 | 7/2008 | |
| WO | WO 2013/056162 A1 | 4/2013 | |
| WO | WO-2013/056162 | * | 5/2013 |

* cited by examiner

LOW VISCOSITY, WATER-BORNE, ACRYLIC MODIFIED ALKYD DISPERSION AND METHOD OF PRODUCTION THEREOF

CROSS-REFERENCE TO RELATED APPLICATIONS

This application is a national stage application under 35 U.S.C. § 371 of PCT/US2014/067023, filed Nov. 24, 2014, which claims benefit to U.S. patent application Ser. No. 61/908,296, filed Nov. 25, 2013.

FIELD OF THE INVENTION

The present invention relates to low viscosity, water-borne, acrylic modified alkyd dispersions that are substantially surfactant free and have low VOCs and methods for making such dispersions. The low viscosity, water-borne, acrylic modified alkyd dispersions comprise hydroxyl functional alkyd polymer, acrylic monomer and isocyanate, wherein the dispersion is substantially surfactant free and has less than 1 weight % VOCs.

BACKGROUND OF THE INVENTION

Alkyd polymers are widely used in the coatings industry because of their excellent gloss characteristics and their ability to adhere to various substrates. These qualities are important for industrial applications. However, regulations related to volatile organic compounds (VOCs) have mandated that the coatings industry decrease the VOC content of their products. In some situations this has required a switch from solvent-based coatings to water-based or water-borne coatings. This has led to performance issues.

For example, water-borne alkyds may have a short shelf life due to poor hydrolytic stability. In an effort to improve the hydrolytic stability of water-borne alkyds and to lower the VOC, there has been developed an acrylic modified alkyd dispersion in which a hydrolysis resistant acrylic polymer becomes a "shell" that covers and protects the "core" alkyd from hydrolysis in the water dispersion. Despite success in extending shelf-life and lowering the VOC to about 100 g/l, such acrylic modified alkyd dispersion may demonstrate poor corrosion resistance. Thus, corrosion resistance remains an area in which improvement is desirable.

Another drawback that water-borne alkyd dispersions face is high viscosity. Measures of coating performance, such as drying time and hardness development, are related to the molecular weight of the alkyd polymer. Thus, it is important that the alkyd polymer have sufficient molecular weight. However, a high molecular weight of the alkyd polymer typically leads to high viscosity for the alkyd dispersion. Processing an alkyd dispersion with a high viscosity may be difficult. However, lowering the amount of alkyd polymer in the dispersion in order to lower the viscosity may result in low resin solids in the alkyd dispersion. Neither of these situations may be desirable. Additionally, alkyd dispersion viscosity may be exacerbated for low VOC alkyd dispersions.

In order to address the issue of high viscosity and low resin solids, formulators have added surfactants to water-borne, low VOC alkyd dispersions. Surfactants have proven helpful to lower the dispersion viscosity for coating applications. Formulators have added surfactants as internal surfactants (i.e., the hydrophilic moiety of the surfactant is reacted with the alkyd polymer). Polyalkylene oxides such as polyethylene oxide and polypropylene oxide have been typically used as internal surfactants.

In another approach to prepare low VOC alkyd product, alkyd emulsion has been introduced that adopts external surfactants (i.e., the surfactant is mixed or otherwise physically blended with the alkyd polymer to form an emulsion). Unfortunately, the presence of a water-sensitive hydrophilic moiety and/or surfactant in the alkyd dispersion and alkyd emulsion has led to a compromise in some of the coating properties of the coatings made with these alkyd products. For example, corrosion resistance and QUV resistance have suffered as a result of using internal and external surfactants in the alkyd dispersion and alkyd emulsion respectively. Corrosion resistance and QUV resistance are important in maintaining coating integrity in outdoor applications.

Further information is described in U.S. Pat. No. 3,639,315, EP application Nos. 2481763 A1 and 2444436 A1, International patent application publication Nos. WO 2004/060949 A1 and WO 2008086977 A1, and Chinese patent application No. CN102108246 A, in the name of Faming Zhuanli Shenqing.

Thus, a need exists for a water-borne, low VOC alkyd product that does not contain internal or external surfactants and has a workable viscosity and excellent coating performance.

SUMMARY OF THE INVENTION

In a first aspect of the invention, a water-borne, acrylic-modified alkyd dispersion, wherein the dispersion is substantially surfactant free and has less than 1 weight % volatile organic compounds (VOCs), based on the total weight of the dispersion, is described. The low viscosity, water-borne, acrylic modified alkyd dispersions of the invention comprise water, one or more alkyd polymers, one or more acrylic polymers, and at least one urethane linkage. Acrylic modified alkyd is the reaction product obtained by reacting an alkyd polymer with a blend of radically polymerizable acrylate monomer(s), methacrylate monomer(s) and/or aromatic monomer(s). Acrylic modified alkyd is also the reaction product of acrylic modified fatty acid(s) and alkyd polymer, wherein an acrylic modified fatty acid(s) is the reaction product of the fatty acid(s) with a blend of radically polymerizable acrylate monomer(s), methacrylate monomer(s) and/or aromatic monomer(s).

In a feature of this aspect, the dispersion is polyalkylene oxide free. In an additional feature of this aspect, the dispersion is polyethylene oxide and polypropylene oxide free. In another feature of this aspect, the dispersion has less than 0.5 weight % isocyanate, preferably less than 0.1 weight percent isocyanate (based on the total weight of the dispersion).

In a further feature of this aspect, the dispersion viscosity is ≤1,500 centipoise. With further regard to this feature, the dispersion viscosity is ≤1,000 centipoise.

With further regard to the first aspect, a resin comprising the acrylic-modified alkyd dispersion may be produced, wherein the resin has a solids content of ≥40 weight %. With further regard to the resin, the resin may have a solids content of ≥45 weight %. The resin may have a QUV gloss retention value of ≥50 in a 20 degree gloss test after 300 hours of QUV exposure.

In another aspect of the invention, a resin is described comprising a water-borne, acrylic modified alkyd dispersion, said dispersion comprising, water, one or more alkyd polymers, more or more acrylic polymers, and at least one urethane linkage, said dispersion having less than 1 weight % surfactant (based on the total weight of the dispersion), less than 1 weight % solvent (based on the total weight of the dispersion), and a viscosity of less than or equal to 1,000 centipoise. The resin has a solids content of greater than or equal to 40 weight % (based on the total weight of the dispersion), wherein the solids content is measured using ASTM D-1259.

In an additional aspect of the invention, a method for preparing a water-borne, substantially surfactant free, acrylic modified alkyd dispersion, with less than 1 weight % VOC (based on the total weight of the dispersion) is described. The method includes reacting an acrylic modified alkyd polymer and a basic compound in water to form an acrylic modified alkyd dispersion having a first viscosity and adding a hydrophobic seed to the acrylic modified alkyd dispersion having a first viscosity to form an acrylic modified alkyd dispersion having a second viscosity, wherein the second viscosity is less than the first viscosity.

In a feature of this aspect, the hydrophobic seed is diisocyanate. Further to this feature, the diisocyanate reacts with the acrylic modified alkyd polymer to form a urethane linkage with the acrylic modified alkyd polymer of the acrylic modified alkyd dispersion. Still further to this feature, the diisocyanate reacts with the acrylic modified alkyd polymer to form a urethane linkage with the acrylic modified alkyd polymer whereby no diisocyanate is present in the product acrylic modified alkyd dispersion. Additionally, the diisocyanate may be one or more of di-cyclohexylmethane-4,4'-diisocyanate, isophorone diisocyanate, xylene diisocyanate, cyclohexane diisocyanate, hexamethylene diisocyanate, tetramethylxylene diisocyanate, or oligomeric hexamethylene diisocyanate.

In an additional feature of this aspect, the method may further comprise heating the alkyd dispersion having a second viscosity after the hydrophobic seed has been added thereto until the hydrophobic seed has reacted completely with the alkyd polymer and the second viscosity is substantially lower than the first viscosity. In another feature of this aspect, the hydrophobic seed alters the morphology of the acrylic modified alkyd polymer in water, such that the acrylic modified alkyd polymer at least partially encapsulates or surrounds the hydrophobic seed, thereby reducing the viscosity of the acrylic modified alkyd dispersion from the first viscosity to the second viscosity.

In another feature of this aspect, the basic compound is ammonium hydroxide, sodium hydroxide, lithium hydroxide, triethyl amine, or n-methyl morpholine. In a further feature of this aspect, the second viscosity is ≤1,500 centipoise. With regard to this feature, the second viscosity is ≤1,000 centipoise.

In another aspect of the invention, the acrylic-modified alkyd dispersion is used in a coating or paint. The coating or paint may be used in indoor and outdoor applications. The outdoor applications may include, but are not limited to, rail car coatings, agricultural machinery coatings, automobile parts coatings, log cabin coatings and deck stains. Additionally, the acrylic-modified alkyd dispersion may be used for automotive, industrial, construction and residential housing applications.

DETAILED DESCRIPTION

The present invention relates to a water-borne acrylic modified alkyd dispersion that has little volatile organic compounds (VOCs) and little to no surfactant. The acrylic modified alkyd dispersion has a relatively low viscosity. The low viscosity enables production of a coating product with high resin solids content, which is desirable from a coating performance and formulation standpoint. A coating with high resin solids content is more efficient and economical because it is possible to achieve the desired coating thickness on a substrate with less coating (i.e., fewer layers of a coating with high resin solids are needed to achieve the desired coating thickness). For example, the acrylic modified alkyd dispersion of the invention may enable a resin solids content of at least about 30 weight % solids (based on the total weight of the dispersion and determined using ASTM test method D-1259). For example, the resin solids content may be about 35%, 40%, 41%, 42%, 43%, 44%, 45%, 46%, 47%, 48%, 49%, or 50%, or more.

With regard to viscosity, the dispersion may have a viscosity of 1,500 centipoise or less, more preferably 1,000 centipoise or less. For example, the dispersion may have a viscosity of 1,000 centipoise, 900 centipoise, 800 centipoise, 700 centipoise, 600 centipoise, 500 centipoise, 400 centipoise, 300 centipoise, 200 centipoise, or 100 centipoise as determined using ASTM test method D2196.

It is desirable to have no, or as little as possible, surfactant present in the dispersion. The acrylic modified alkyd dispersion of the invention does not include intentionally added internal or external surfactant. Advantageously, the acrylic modified alkyd dispersions of the invention have low viscosity without the use of intentionally added surfactant or added water-sensitive hydrophilic moiety such as a polyalkylene oxide.

Nonetheless, during the preparation process it is understood that some surfactant may be inadvertently introduced into the preparation process. For example, surfactant may be introduced to the dispersion through the addition of other components that contain minor amounts of surfactant and are therefore unintentionally added to the dispersion.

For purposes of the present invention, the term "substantially surfactant free" or "substantially free of surfactant" means an alkyd dispersion having up to 1 weight % surfactant (based on the total weight of the dispersion), wherein any surfactant present in the alkyd dispersion is unintentionally added surfactant. For example, the term "substantially surfactant free" may include a dispersion having 0.9%, 0.8%, 0.7%, 0.6%, 0.5%, 0.4%, 0.3%, 0.2%, 0.1%, or less surfactant. The term "surfactant free" means 0% surfactant.

In one embodiment, the acrylic modified alkyd dispersion is also free of polyalkylene oxide. For example, the dispersion may be free of polyethylene oxide and polypropylene oxide.

The absence of a surfactant is beneficial from a coating performance standpoint, particularly for outdoor applications. Having a surfactant in the coating resin may lead to a compromise in coating properties such as corrosion resistance and QUV resistance. Thus, the presence of little to no surfactant or hydrophilic moiety in the dispersion is advantageous.

The acrylic modified alkyd dispersion has the ability to produce a high gloss film without the use of a coalescing solvent. Additionally, the dispersion is able to produce a coating having a coating dry time and hardness equivalent to higher VOC containing alkyd technologies.

For purposes of the present application, the term "substantially free of VOC" or "substantially VOC free" means a dispersion having up to 1 weight % volatile organic compounds (VOC) (based on the total weight of the dispersion). Preferably, the dispersion will have less than 0.5 weight % VOC. It is understood that a small amount of VOCs (generally in the form of solvent) may be present in the alkyd dispersion preparation process.

In one embodiment of the invention, a hydrophobic "seed" is used to prepare the acrylic modified alkyd dispersion. While not being bound by any theory, it is believed that the hydrophobic seed compound may aid in reducing the dispersion viscosity during the method of preparation by altering the morphology of the alkyd polymer in water.

In one embodiment, an alkyd polymer and an acrylic modified fatty acid are combined to form a core-shell structure wherein the alkyd polymer is the core and the acrylic modified fatty acid is the shell. The resulting combination is an acrylic modified alkyd polymer with a core-shell structure. It will be appreciated by one of ordinary skill in the art that the low viscosity alkyd dispersion of the present invention may be prepared without the inclusion of the acrylic modified fatty acid. The acrylic modified fatty acid is included herein for exemplary purposes, but is not required to prepare the low viscosity alkyd dispersion. For example, an acrylic modified alkyd polymer with a core-shell structure may also be produced by radical polymerization of ethylenically unsaturated monomers in the presence of alkyd polymer.

The acrylic modified alkyd polymer having the core-shell structure is combined with water and a basic compound to form a high viscosity alkyd dispersion. Then a hydrophobic seed is added to the high viscosity alkyd dispersion and the mixture is heated. While not being bound by any theory, it is believed that the acrylic modified alkyd polymer may react with the hydrophobic seed to form a low viscosity alkyd dispersion.

In one embodiment, the alkyd polymer may be prepared by heating a fatty acid, a polyol compound and an acid compound with distillation of water. Exemplary fatty acids include, but are not limited to, dehydrated castor oil fatty acid, soybean oil fatty acid, tall oil fatty acid, sunflower fatty acid, coconut fatty acid, castor oil fatty acid, linseed oil fatty acid, tung oil fatty acid, safflower fatty acid, and lineloic acid. Exemplary polyol compounds include, but are not limited to, trimethyol propane, pentaerythritol, trimethyol ethane, ethylene glycol, sorbitol, 2-methyl 1,3-propane diol, neopentyl glycol, 2,2,4-trimethyl pentanediol, propylene glycol, hydrogenated bisphenol A, 1,4-butanediol, 1,6-hexanediol, and dimethyol propionic acid. Exemplary acid compounds include, but are not limited to, phthalic anhydride, isophthalic acid, terephthalic acid, trimellitic anhydride, pyromelltic anhydride, 5-(sodiosulfo)-isophthalic acid, 1,4-cyclohexyl dicarboxylic acid, adipic acid, maleic anhydride, tetrahydrophthalic anhydride, hexahydrophthalic anhydride, succinic anhydride, succinic acid, and benzoic acid. Additional components may be added in the preparation of the alkyd polymer. Exemplary additional components include, but are not limited to, organic solvents such as methyl amyl ketone and xylene. Any organic solvents that remain in the final product at the end of the synthesis process may be removed, using means such as vacuum distillation, or by heating the product at a temperature that is higher than the boiling point of the solvent, or by using a combination of both.

Once the reagents are combined, the mixture is heated to a temperature of between about 200° C. and 300° C., and the temperature is maintained until the product alkyd polymer has an acid value below 12 as determined using ASTM test method D1639. For example, the reaction temperature may be about 210° C., 220° C., 230° C., or 240° C. Additional acid values for the alkyd polymer may include 11, 10, 9, 8, 7, 6, 5, 4, or 3. As one of ordinary skill in the art will understand, a lower acid value for the alkyd polymer is desirable for the final product. One of ordinary skill in the art will also understand that the reagents may be added to the reaction container simultaneously or consecutively. One of ordinary skill in the art will further understand that the temperature may be reduced below the reaction temperature (i.e., below 200° C.) and then increased again to the reaction temperature during the course of the reaction for various purposes (for example, to add another reagent or for intermediate reactions to occur).

In one embodiment, the acrylic modified fatty acid may be prepared by polymerization of ethylenenically unsaturated vinyl or (meth) acrylate monomers in the presence of unsaturated fatty acid at a reaction temperature with an initiator. Exemplary vinyl or (meth) acrylate monomers include, but are not limited to, methacrylic acid, isobutyl methacrylate, 2-ethyl hexyl acrylate, vinyl toluene, isobornyl (meth)acrylate, stearyl methacrylate, diacetone acrylamide, acetoacetoxy ethyl methacrylate, and styrene. Ethylenenically unsaturated monomers may include one or more additional different types of functional groups, particularly reactive, polar, chelating and/or heteroatom-containing functional groups. These functional groups may be varied and chosen as desired to modify certain characteristics of the acrylic modified alkyd dispersion, such as the wet adhesion, scrub resistance (washability), stain resistance, solvent resistance and block resistance properties of a coating composition which includes acrylic modified alkyd dispersion. For example, the functional groups may be selected from amino, ureido, urea, hydroxyl, silane, phosphate, fluorocarbon, and epoxy functional groups and combinations thereof. Suitable amino functional groups include primary, secondary and tertiary amine groups. The amino functional group may be present in the form of a heterocyclic ring. The amino functional group may, for example, be an oxazoline ring. Other types of functional groups useful in the present invention include, for example, hydroxyl (—OH), silane (e.g., trialkoxysilyl, —Si(OH)$_3$), phosphate (e.g., PO$_3$H and salts thereof), fluorocarbon (e.g., perfluoroalkyl such as trifluoromethyl), polyether (e.g., polyoxyethylene, polyoxypropylene), and epoxy (e.g., glycidyl). In one embodiment, the functional group contains a Lewis base such as the nitrogen atom of an amine. In another preferred embodiment, the functional group contains a hydroxyl functional group. The functional group may be reactive; for example, the functional group may be capable of reacting as an electrophile or a nucleophile. The functional group, or a combination of functional groups in proximity to each other, may be capable of complexation or chelation. Exemplary fatty acids include, but are not limited to, linoleic acid, tall oil fatty acid, sunflower fatty acid, linseed oil fatty acid, tung oil fatty acid, safflower fatty acid, lineloic acid and dehydrated castor oil fatty acid. Exemplary initiators include, but are not limited to, 2,2-azobisisobutyronitrile, 1,1-azobiscyclohexane carbonitrile, t-butyl peroxy benzoate, t-butyl peroctoate, di-t-amyl peroxide, di-t-butyl peroxide, t-butyl peroxybenzoate, and benzoyl peroxide.

The reaction temperature may be between about 100° C. and 200° C. For example, the reaction temperature may be about 120° C., 130° C., 140° C., 150° C., 160° C., 170° C., or 180° C. The reagents are heated for a sufficient amount of time for the reaction to take place. One of ordinary skill in the art will understand that reagents may be added to the reaction container simultaneously or consecutively. One of ordinary skill in the art will also understand that the temperature may be lowered below the reaction temperature (i.e., below 100° C.) and then increased again to the reaction temperature during the course of the reaction for various purposes (for example, to add another reagent or for intermediate reactions to occur). The acrylic modified fatty acid may comprise 20-60% by weight unsaturated fatty acid, preferably 40-50% by weight, 3-20% by weight methacrylic acid, preferably 10-15% by weight, 0-20% by weight styrene or alkyl substituted styrene, preferably 10-20% by weight, 10-50% by weight of other (meth)acrylate monomers, preferably 10-30%, and 0-15% by weight of other monomers containing functional groups, preferably 0-5% by weight (all weight percentages based on total weight of acrylic modified alkyd polymer).

The alkyd polymer and the acrylic modified fatty acid form a core-shell structure with the alkyd polymer being the core and the acrylic modified fatty acid being the shell. The reagents are added to a reaction container and heated to a reaction temperature that is maintained until the acid value reaches the theoretical acid value calculated based on the amount of acid used for the preparation of acrylic modified fatty acid, the acid value of the "core" alkyd, and the ratio between the "core" alkyd and the acrylic modified fatty acid. For example, the theoretical acid value may be in the range of 30 to 90. The reaction temperature may be between about 150° C. and 250° C. For example, the reaction temperature may be about 170° C., 180° C., 190° C., 200° C., 210° C., 220° C., or 230° C. The acrylic modified alkyd polymer may comprise 20-70% by weight acrylic modified fatty acid, preferably 40-60% by weight, 5-60% by weight unsaturated fatty acids, preferably 20-50% by weight, 5-30% by weight polyol compounds having 2 to 6 hydroxy groups, preferably 10-20% by weight, and 5-30% by weight aromatic or aliphatic acids or anhydrides having 1 to 4 carboxylic groups, preferably 10-20% by weight.

The core-shell polymer and a basic compound are reacted in water to form an acrylic modified alkyd dispersion. Exemplary bases include, but are not limited to, ammonium hydroxide, triethyl amine, n-methyl morpholinem, n,n-dimethyl ethanol amine, lithium hydroxide, sodium hydroxide, and potassium hydroxide. The reaction temperature for the dispersion in water is between about 20° C. and 90° C. For example, temperature may be about 20° C., 30° C., 40° C., 50° C., 60° C., 70° C., 80° C., or 90° C. The structure of the core-shell polymer is a relatively linear polymer chain. Thus, the polymer forms a plurality of somewhat linear polymer chains that are dispersed in the water. As a result, the viscosity of the alkyd dispersion is relatively high. For example, the viscosity is greater than 100,000 centipoise using ASTM test method D2196.

To reduce the viscosity of the alkyd dispersion, a hydrophobic compound (that is, a hydrophobic seed compound) is added to the alkyd dispersion. The hydrophobic seed is added after the alkyd polymer has been dispersed in water. The amount of hydrophobic compound that is added may be from about 0.5 to 10% by weight based on the polymer content, preferably 1 to 7% by weight, more preferably 2 to 5% by weight. The reaction temperature may be around about 10° C. to 100° C. For example, the temperature may be about 50° C., 60° C., 70° C., 80° C., 90° C. or 100° C. The viscosity of the alkyd dispersion drops drastically after the hydrophobic seed is added. For example, the viscosity may be less than or equal to 1500 centipoise, more preferably less than or equal to 1000 centipoise determined using ASTM test method D2196. For example, the alkyd dispersion may have a viscosity of 1000 centipoise, 900 centipoise, 800 centipoise, 700 centipoise, 600 centipoise, 500 centipoise, 400 centipoise, 300 centipoise, 200 centipoise, or 100 centipoise.

Figure 1:
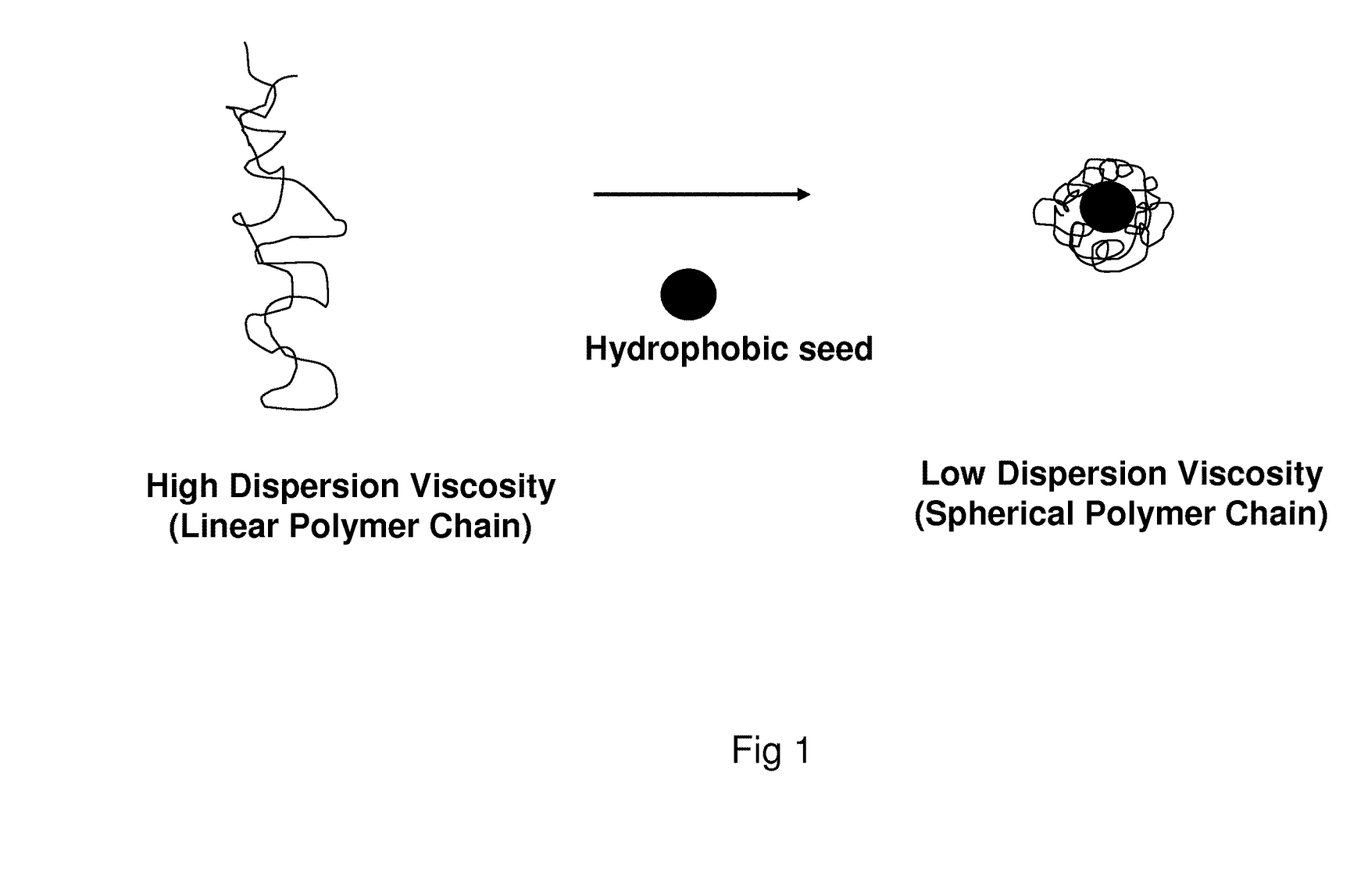
FIG. 1 is a graphical representation of a linear polymer chain of the acrylic modified alkyd polymer around the hydrophobic seed to form a substantially spherical structure wherein the polymer substantially surrounds the hydrophobic seed.

Without being bound by theory, it is believed that the linear polymer chain of the acrylic modified alkyd polymer mobilizes toward the hydrophobic seed compound by hydrophobic-hydrophobic interaction to form an emulsion-like structure. FIG. 1 provides a schematic graphical representation of the linear polymer chain at least partially wrapping around the hydrophobic seed to form a substantially spherical structure wherein the polymer surrounds the hydrophobic seed to some degree. While FIG. 1 shows a substantially spherical structure, the polymer chain may only partially encapsulate the hydrophobic seed and still be within the invention. Partial encapsulation of the hydrophobic seed by the linear polymer also provides a decrease in viscosity.

In one embodiment, most hydrophobic seed compound reacts with the alkyd polymer to become a part of the core-shell polymer. The reaction time may be from about 3 hours to about 24 hours. The reaction time concludes when all the hydrophobic seed compound has reacted and dispersion viscosity is substantially reduced. If a significant amount of non-polymeric low molecular weight hydrophobic compound is present in the coating, it can be detrimental to the performance of the coating. For example, coating properties such as hardness, dry time, and weatherability may suffer if the hydrophobic compound remains in the coating. Thus, it is desirable that most, if not all, of the hydrophobic seed compound reacts with the polymer to become a part of the polymer.

The hydrophobic seed compound may be hydrophobic isocyanate. Exemplary isocyanates include, but are not limited to, di-cyclohexylmethane-4,4'-diisocyanate, isophorone diisocyanate, xylene diisocyanate, cyclohexane diisocyanate, hexamethylene diisocyanate, tetramethylxylene diisocyanate and oligomeric hexamethylene diisocyanate. Trade names for di-cyclohexylmethane-4, 4'-diisocyanate and isophorone diisocyanate include Desmodur W® and Desmodur I®, respectively, available from Bayer Inc. Isocyanate readily reacts with the hydroxy group of the alkyd polymer to form a urethane linkage. Thus, a urethane linkage may be detectable by infrared spectroscopy in the acrylic modified alkyd dispersion. Complete consumption of the isocyanate during the process is desirable. As such, the final acrylic modified alkyd dispersion may have less than 0.5 weight % isocyanate, preferably less than 0.1 weight % isocyanate, and more preferably less than 0.05 weight % isocyanate, based on the total weight of the dispersion.

A preferred embodiment of the acrylic modified alkyd dispersion has a viscosity of less than or equal to 1,000 centipoise, is substantially surfactant free and substantially VOC free, has less than 1 weight % solvent, and has urethane linkages present. This preferred acrylic modified alkyd dispersion has a resins solid content of greater than 40%.

Another preferred embodiment of the acrylic modified alkyd dispersion has a viscosity of less than or equal to 1,000 centipoise, is surfactant free, substantially VOC free, has less than 0.5 weight % solvent, has urethane linkages present, and has a resins solid content of greater than 45%.

The acrylic modified alkyd dispersion has improved performance characteristics relative to water-borne alkyd products that utilize surfactants. Various analysis methods can be performed in order to determine the performance characteristics of a coating product. For example, salt-fog exposure tests can be performed to determine the corrosion resistance ability of a coating product. In salt-fog exposure testing, a metal substrate coated with a paint or coating prepared with the polymer to be tested is continuously exposed to a spray of 5% NaCl solution in deionized water at 35° C. for varying amounts of time. Additionally, testing can be performed to evaluate the gloss retention characteristics of a coating product. In gloss retention evaluations, coatings on metal or stable non-metal substrates are exposed to Q-Panel Fluorescent bulb UVA-340 with a cycle of 4 hour condensation at 50° C. and 4 hour UV exposure at 60° C. to simulate the deterioration caused by sunlight and water as rain or dew for varying amounts of time.

Figure 2:
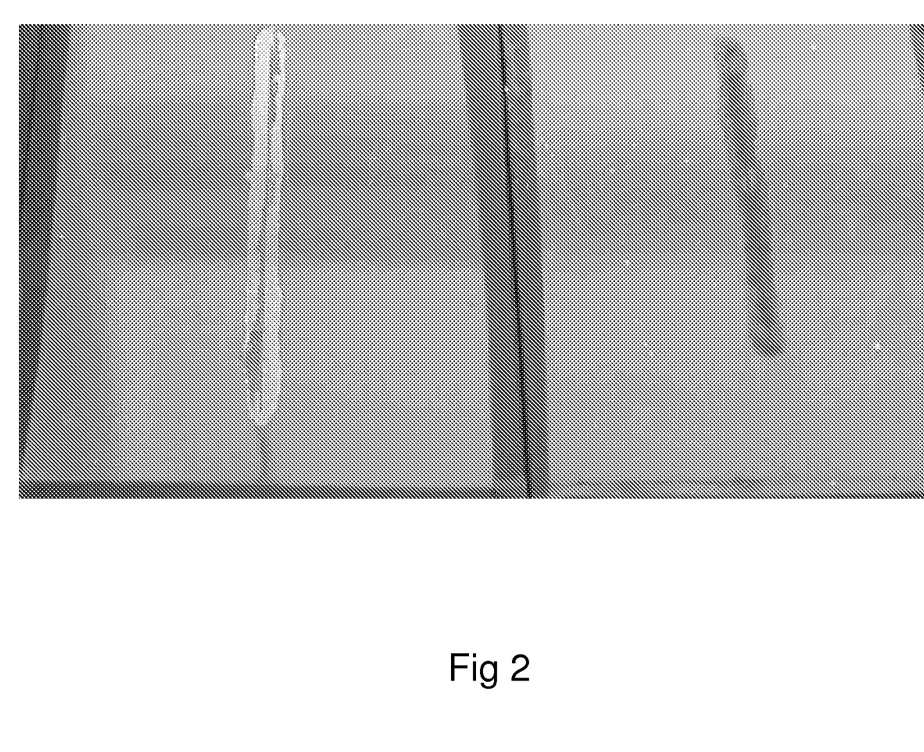
FIG. 2 is a photograph showing the corrosion resistance and gloss retention of the acrylic modified alkyd dispersion of the present invention (left) in comparison to the corrosion resistance and gloss retention of an alkyd emulsion product (right).

With regard to corrosion resistance, the acrylic modified alkyd dispersion shows improved corrosion resistance relative to alkyd emulsion products in salt fog exposure testing. FIG. 2 is a photograph showing the corrosion resistance of the acrylic modified alkyd dispersion (left photograph) in comparison to the corrosion resistance of an alkyd emulsion product (right photograph). As can be seen in FIG. 2, the alkyd dispersion product provides corrosion resistance that is superior to the alkyd emulsion product. That is, as can be seen in FIG. 2, the coating made with the alkyd dispersion product of the present invention retained more of a glossy, shiny, reflective finish during the salt fog exposure testing than the coating made with the alkyd emulsion product.

Figure 3:
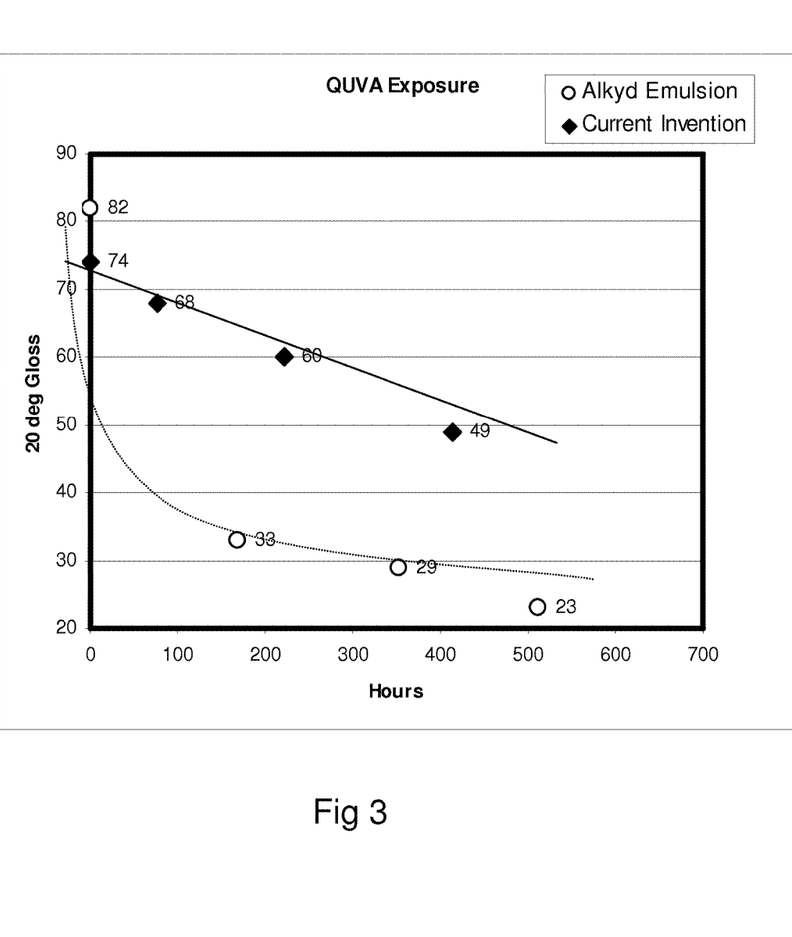
FIG. 3 is a graphical representation of the gloss retention properties of the acrylic modified alkyd dispersion of the present invention in comparison to an alkyd emulsion with external surfactants.

The acrylic modified alkyd dispersion also exhibits improved gloss retention. FIG. 3 provides a graphical representation of the gloss retention properties of the acrylic modified alkyd dispersion of the present invention in comparison to an alkyd emulsion with an external surfactant. For the gloss retention testing in FIG. 3, the alkyd dispersion of the present invention maintained a higher gloss value through 500 hours of testing.

The alkyd dispersions of the invention may be further modified by the addition of additives, including one or more selected from the group consisting of crosslinkers, pigments, extenders, plasticizers, ultraviolet light stabilizers, fillers, defoamers, anti-settling agents, wetting agents, thickeners, biocides, and coalescing agents. Useful crosslinkers are multi-functional hydrizides including adipic dihydrize when a diacetone functional monomer such as diacetone acrylamide is used to prepare acrylic modified alkyd dispersion. Another useful crosslinkers are multi-functional primary amines, for example, ethylene diamine, 1,4-butylene diamine and 1,6-hexamethylene diamine when an acetoacetate functional monomer such as acetoacetoxy ethyl methacrylate is used to prepare acrylic modified alkyd dispersion.

One embodiment of the invention is directed to a composition comprising (i) a water-borne, urethane and acrylic-modified alkyd dispersion comprising water, alkyd polymer, acrylic polymer, and urethane linkage, wherein the dispersion is substantially surfactant free and has less than 1 weight % VOCs, where the acrylic polymer is made from diacetone functional monomer and one or more ethylenically unsaturated monomers, and (ii) one or more multi-functional hydrizide compounds.

In another embodiment, the invention is directed to a composition comprising, (i) a water-borne, urethane and acrylic-modified alkyd dispersion comprising water, alkyd polymer, acrylic polymer, and urethane linkage, wherein the dispersion is substantially surfactant free and has less than 1 weight % VOCs, where the acrylic polymer is made from acetoacetate functional monomer and one or more ethylenically unsaturated monomers, and (ii) multi-functional primary amine compounds.

The water-borne, acrylic-modified alkyd dispersions of the invention may be used for a variety of coatings and/or paint purposes. They may be applied by conventional means such as dipping, brushing, or spraying onto a variety of surfaces such as wood, fabricated wood, paper, cardboard, textiles, synthetic resins, ceramics, ferrous metals, non-ferrous metals, stone, concrete, plaster, and the like.

The water-borne, acrylic-modified alkyd dispersions of the invention are useful for indoor and outdoor applications. Outdoor applications may include metal coatings. Further, exemplary outdoor applications may include, but not be limited to, rail car coating, agricultural machinery coating, automobile parts coating, log cabin coatings and deck stains, The water-borne, acrylic-modified alkyd dispersions also provide coatings for automotive, industrial, construction and residential housing applications, including for example, wood stains, porch and deck stains, glossy top coats, traffic paints, general metal coatings, kitchen cabinetry coatings, automobile refinish, lawn and garden equipment coatings, bus and truck top coatings, gloss trim enamels, metal primers, light duty maintenance coatings, furniture coatings, stain blocking coatings, appliance coatings, dumpster coatings, heavy duty equipment coatings, industrial equipment coatings, and sash and trim enamels. The water-borne, acrylic-modified alkyd dispersions of the invention are also useful for adhesive and ink applications.

EXAMPLES

Example 1

The viscosity lowering effect of a hydrophobic seed compound on an acrylic modified alkyd dispersion is shown in the following example. An acrylic modified alkyd dispersion was prepared. 3% Desmodur W® (the percent being based on the acrylic modified alkyd polymer) was added into the highly viscous alkyd dispersion at 48° C. The temperature was then raised to 80° C. The temperature was maintained at 80° C. for a few hours to ensure that all of the diisocyanate reacted with the hydroxy groups from alkyd polymer.

Figure 4:
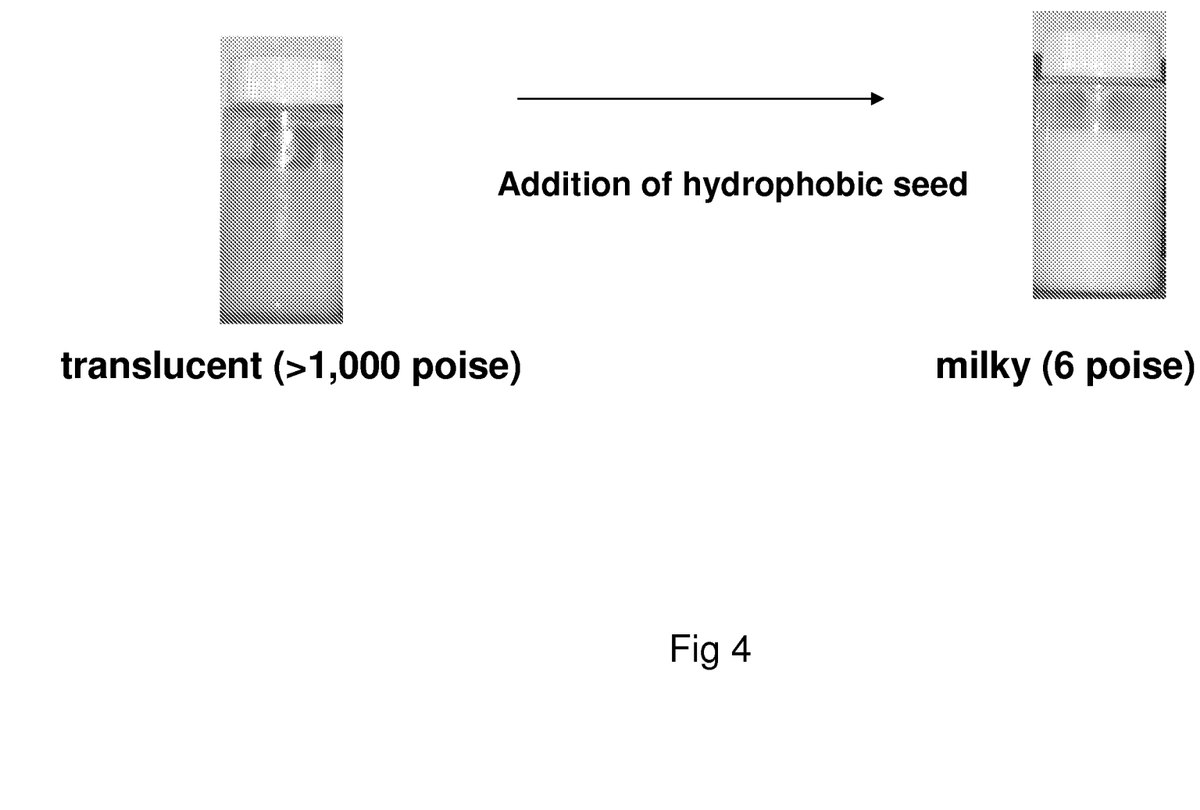
FIG. 4 is a set of photographs of the acrylic modified alkyd dispersion of the present invention showing an appearance change in the dispersion from translucent to milky upon the addition of a hydrophobic seed.

The dispersion viscosity dropped markedly and the appearance of the dispersion changed from translucent to milky after the addition of Desmodur W®. FIG. 4 provides photographs of the acrylic modified alkyd dispersion before the hydrophobic seed was added and after the hydrophobic seed was added. The transition from highly viscous and translucent to milky is shown in FIG. 4.

Physical properties of the dispersion were measured during the process. The results of the measurements are shown in Table 1. The physical properties that were measured include: water-miscibility, pH, and viscosity as a function of heating time after Desmodur W® was added to alkyd dispersion.

TABLE 1

| Sample | 1 | 2 | 3 | 4 | 5 |
|---|---|---|---|---|---|
| Heating history | 0 | 60 m@48° C. | 60 m@48° C. + 60 m@80° C. | 60 m@48° C. + 120 m@80° C. | 60 m@48° C. + 120 m@80° C. + overnight @RT |
| NV | 43.2 | — | 43.8 | — | 43.6 |
| Water miscibility | OK | partial | OK | OK | OK |
| pH | 8.30 | 8.23 | 8.29 | 8.12 | 8.13 |
| Viscosity (cps) | >100,000 | >100,000 | 40,500 | 650 | 600 |

(m = minutes, cps = centipoise, RT = room temperature)

As is shown in Table 1, when Desmodur W® is added to the dispersion, the dispersion viscosity drops from greater than 100,000 centipoise to 600 centipoise. The results in Table 1 show that a hydrophobic seed compound is effective in lowering the dispersion viscosity without using a surfactant.

Infrared spectroscopy confirmed that Desmodur W® formed a urethane linkage during the process and no detectable isocyanate remained in the coating polymer after the process.

Example 2

A low viscosity, water borne, substantially VOC free, surfactant free acrylic modified alkyd dispersion is prepared in the following example.

The alkyd polymer was prepared as follows.

| Charge | Ingredient | Grams |
|---|---|---|
| A | m-Pentaerythritol | 230 |
|  | Hydrogenated Bisphenol A | 472 |
|  | Di-pentaerythritol | 130 |
|  | Dehydrated castor oil fatty acid | 577 |
|  | Soybean oil fatty acid | 144 |
|  | Methyl amyl ketone | 30 |
| B | Isophthalic acid | 375 |

Charge A was added to a flask equipped with a nitrogen blanket and a reflux condenser. The temperature was raised to 210° C. while collecting condensed water in a Dean-Stark trap. The temperature was maintained until the material became clear. The temperature was then lowered to below 160° C., and then Charge B was added. The temperature was then raised to 220° C. while collecting condensed water. The temperature was maintained until the acid value of the polymer dropped below 10.0. The measured viscosity was $Z_2$-$Z_4$ (about 4,000-7,000 centipoise) at 80 NV in methyl amyl ketone.

Acrylic modified fatty acids were prepared as follows.

| Charge | Ingredient | Grams |
|---|---|---|
| A | Linoleic acid* | 300 |
|  | Dehydrated castor oil fatty acid | 1700 |
| B | Styrene | 556 |
|  | Isobutyl methacrylate | 706 |
|  | Methacrylic acid | 450 |
|  | di-t-butyl peroxide | 50 |

(*Pamolyn ® 200 from Eastman Chemicals)

Charge A was added to a flask equipped with a nitrogen blanket. The temperature was raised to 160° C. Charge B was added to the flask over 5.5 hours while the temperature was maintained at 160° C. The reaction was held for 2 hours after the addition of Charge B was completed, and then cooled. The viscosity was U-W at 80 NV in methyl amyl ketone.

The low viscosity acrylic modified alkyd dispersion was prepared as follows.

| Charge | Ingredient | Grams |
|---|---|---|
| A | Alkyd polymer | 350 |
|  | Acrylic modified fatty acid | 420 |
| B | De-ionized water | 955 |
|  | Ammonium hydroxide (28-30%) | 28 |
| C | Desmodur W ® | 28 |

The alkyd polymer and the acrylic modified fatty acid were added to a flask equipped with a nitrogen blanket and a water-receiver. The temperature was raised to 190° C. while collecting condensed water and methyl amyl ketone. The temperature was maintained until the acid value dropped below 55. The viscosity of the acrylic modified alkyd polymer was V-X (about 750-1,500 centipoise) at 70 NV in methyl amyl ketone prior to being dispersed in water.

For the dispersion preparation step, the temperature was lowered below 100° C., and de-ionized water and ammonium hydroxide were added to the flask. After mixing for 20 minutes, Desmodur W® was added to the flask, and the temperature was raised to 80° C. The reaction was held for 3.5 hours at 80° C. with moderate agitation before cooling to ambient temperature. The resulting dispersion had an NVM of 42.9, a viscosity of 700 cps, and pH value of 8.15.

While the invention has been described in detail and with reference to specific embodiments thereof, it will be apparent to one skilled in the art that various changes and modifications can be made without departing from the spirit and scope of the invention.

The invention claimed is:

1. A resin comprising a water-borne, urethane and acrylic modified alkyd dispersion, said dispersion comprising water, alkyd polymer, acrylic polymer, and at least one urethane linkage, said alkyd-acrylic-urethane dispersion resulting from addition of hydrophobic seed which is multifunctional isocyanate, where said dispersion has less than 0.1 weight % surfactant, less than 1 weight % solvent, less than 1 weight % volatile organic compounds, and a viscosity of less than or equal to 1,000 centipoise,
wherein said resin has a solids content of greater than or equal to 40 weight %.

2. A method for preparing a water-borne, urethane and acrylic-modified alkyd dispersion, comprising water, one or more alkyd polymers, one or more acrylic polymers made from one or monomers selected from the group consisting of methacrylic acid, isobutyl methacrylate, 2-ethyl hexyl acrylate, vinyl toluene, isobornyl (meth)acrylate, stearyl methacrylate, diacetone acrylamide, acetoacetoxy ethyl methacrylate and styrene, and at least one urethane linkage, wherein the dispersion has less than 1.0 weight % surfactant, less than 1 weight % volatile organic compounds (VOCs), and wherein the dispersion viscosity is <1.500 centipoise, the method comprising:

reacting an acrylic modified alkyd polymer with a basic compound in water to form an acrylic modified alkyd dispersion having a first viscosity;

adding a hydrophobic seed which is multifunctional isocyanate to the acrylic modified alkyd dispersion having a first viscosity to form a mixture and heating said mixture to form an urethane and acrylic modified alkyd dispersion having a second viscosity, wherein the second viscosity is less than the first viscosity.

3. The method of claim 2, wherein the multifunctional isocyanate reacts with the acrylic modified alkyd polymer to form a urethane linkage with the acrylic modified alkyd polymer of the acrylic modified alkyd dispersion.

4. The method of claim 3, wherein the multifunctional isocyanate reacts with the acrylic modified alkyd polymer to form a urethane linkage with the acrylic modified alkyd polymer whereby less than 0.1 weight % multifunctional isocyanate is present in the product of urethane and acrylic modified alkyd dispersion.

5. The method of claim 2, wherein the multifunctional isocyanate is selected from the group consisting of di-cyclohexylmethane-4,4'-diisocyanate, isophorone diisocyanate, xylene diisocyanate, cyclohexane diisocyanate, hexamethylene diisocyanate, oligomeric hexamethylene diisocyanate, tetramethylene diisocyanate and mixtures thereof.

6. The method of claim 2, further comprising heating the alkyd dispersion having a second viscosity after the hydrophobic seed has been added thereto until the hydrophobic seed has reacted with the alkyd polymer.

7. The method of claim 2, wherein the acrylic modified alkyd polymer at least partially encapsulates the hydrophobic seed.

8. The method of claim 2, wherein the basic compound is ammonium hydroxide.

9. The method of claim 2, wherein the second viscosity is ≤1,500 centipoise.

10. The method of claim 2, wherein the second viscosity is ≤1,000 centipoise.

* * * * *